United States Patent
Wirz et al.

(10) Patent No.: US 10,859,324 B2
(45) Date of Patent: Dec. 8, 2020

(54) MODULAR THERMAL ENERGY STORAGE SYSTEM

(71) Applicant: The Regents of the University of California, Oakland, CA (US)

(72) Inventors: Richard E. Wirz, Los Angeles, CA (US); Parker A. Wells, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 158 days.

(21) Appl. No.: 16/083,450

(22) PCT Filed: Feb. 28, 2017

(86) PCT No.: PCT/US2017/019939
§ 371 (c)(1),
(2) Date: Sep. 7, 2018

(87) PCT Pub. No.: WO2017/151606
PCT Pub. Date: Sep. 8, 2017

(65) Prior Publication Data
US 2019/0072338 A1    Mar. 7, 2019

Related U.S. Application Data

(60) Provisional application No. 62/301,609, filed on Feb. 29, 2016, provisional application No. 62/301,613, filed on Feb. 29, 2016.

(51) Int. Cl.
*F28D 17/04* (2006.01)
*F28D 20/02* (2006.01)
*F28D 20/00* (2006.01)

(52) U.S. Cl.
CPC ........... *F28D 17/04* (2013.01); *F28D 20/028* (2013.01); *F28D 2020/0004* (2013.01);
(Continued)

(58) Field of Classification Search
CPC .............. F28D 17/04; F28D 20/028; F28D 2020/0004; F28D 2020/006;
(Continued)

(56) References Cited

U.S. PATENT DOCUMENTS 3,823,305 A * 7/1974 Schroder ............... F24H 7/0416
392/344
3,991,936 A * 11/1976 Switzgable ............. F28D 15/00
126/590
(Continued)

OTHER PUBLICATIONS

International Search Report and Written Opinion, dated May 24, 2017, in corresponding International Application No. PCT/US2017/019939, filed Feb. 28, 2017 (9 pages).

*Primary Examiner* — Jianying C Atkisson
*Assistant Examiner* — Jose O Class-Quinones
(74) *Attorney, Agent, or Firm* — Christensen O'Connor Johnson Kindness, PLLC

(57) ABSTRACT

A thermal energy storage (TES) system includes a plurality of closely packed TES modules, each TES module having a shell enclosing a plurality of sealed tubes that each contain a TES media. A computer-controlled flow control system includes a flow distributor, for example a flow distributor having a plenum configured to receive a heat transfer fluid (HTF), and a plurality of control valves controlled by the computer to controllably distribute the HTF from the plenum to the plurality of TES modules. Sensor data from the TES modules, for example temperature, pressure, and/or flow data, is provided to the computer. In some embodiments the plenum includes two or more compartments with separate HTF flow ports, which may be provided to the controller at different temperatures.

18 Claims, 6 Drawing Sheets

(52) U.S. Cl.
CPC .............. *F28D 2020/006* (2013.01); *F28D 2020/0069* (2013.01); *Y02E 60/145* (2013.01)

(58) Field of Classification Search
CPC ..... F28D 2020/0069; F28D 2020/0026; F28D 2020/0078; F28D 2020/0082; F28D 20/021; F28D 20/026; Y02E 60/145; Y02E 60/142
See application file for complete search history.

(56) References Cited

U.S. PATENT DOCUMENTS

| | | | | |
|---|---|---|---|---|
| 4,127,161 A | * | 11/1978 | Clyne | F28D 20/02 |
| | | | | 126/400 |
| 4,139,056 A | * | 2/1979 | Scholl | F28D 20/0039 |
| | | | | 165/104.31 |
| 4,223,721 A | * | 9/1980 | Schoenfelder | F28D 20/02 |
| | | | | 126/400 |
| 4,267,881 A | * | 5/1981 | Byerly | F28D 20/0052 |
| | | | | 126/641 |
| 4,291,750 A | * | 9/1981 | Clyne | F28D 20/02 |
| | | | | 126/641 |
| 4,347,892 A | * | 9/1982 | Clyne | F28D 20/02 |
| | | | | 126/645 |
| 2012/0055661 A1 | | 3/2012 | Feher | |
| 2012/0080168 A1 | | 4/2012 | Hemrle et al. | |
| 2014/0074314 A1 | | 3/2014 | Niknafs et al. | |
| 2014/0102662 A1 | | 4/2014 | Grama et al. | |
| 2015/0060008 A1 | | 3/2015 | Wirz et al. | |

\* cited by examiner

MODULAR THERMAL ENERGY STORAGE SYSTEM

CROSS-REFERENCES TO RELATED APPLICATIONS

This application claims the benefit of U.S. Application No. 62/301,613, filed Feb. 29, 2016, and U.S. Application No. 62/301,609, filed Feb. 29, 2016, entire disclosures of said applications are hereby incorporated by reference herein.

STATEMENT OF GOVERNMENT LICENSE RIGHTS

This invention was made with Government support under Grant No. DE-AR0000140 awarded by DOE ARPA-E. The Government has certain rights in the invention.

BACKGROUND

Thermal energy storage (TES) systems may be used as an efficiency component in power systems, for example to store excess energy when energy production exceeds demand, and to release the stored excess energy when energy demand exceeds the production capacity. Such systems are particularly beneficial for power systems that incorporate significant renewable energy production, when the availability of the renewable energy is irregular or periodic. In addition to avoiding energy shortages, TES systems may improve efficiency and costs for the energy provider by allowing the provider to reduce or eliminate the need to purchase or generate high-cost energy during peak demand periods, and/or by reducing the capital costs associate with increasing power production capacity.

Prime movers or generators operate at maximum efficiency at known set point temperatures and heat rates. Deviation from design heat rates and temperatures causes drastic drop-offs in electricity generation efficiency. In industrial power applications heat requirements may dictate the efficacy of the main facility that a combined heat and power (CHP) plant or other heat source is attached to. An exemplary power production and TES system using thermal energy storage is disclosed in International Publication No. WO 2016/210433, to Lavine et al, which is hereby incorporated by reference in its entirety.

In U.S. Patent Application Publication No. 2015/0060008, to Wirz et al., which is hereby incorporated by reference in its entirety, a thermal energy storage (TES) system is disclosed having a plurality of containers that enclose a thermal storage media, for example, elemental sulfur. The containers are disposed in an outer shell such that a heat transfer fluid (HTF) flowing through the shell will exchange thermal energy with a thermal energy storage (TES) media. For example, during charging cycles a hotter HTF flowing through the shell will heat the TES media (through the container walls), to store the thermal energy therein. During a discharging cycle, when the stored thermal energy is needed for other purposes, a cooler HTF flowing through the shell will extract heat from the TES media, typically transporting the energy to the user of the thermal energy. For example, stored thermal energy may be transported to a power block, for example a Brayton or Rankine cycle power block, to generate electrical energy.

Often the thermal energy user, for example, a typical Rankine power block, will require or operate most efficiently with energy provided in a fluid stream having a specified mass flow rate and a specified temperature. A conventional TES system may not be able to provide uniform flow and temperature characteristics for such a system. As energy is extracted from a conventional TES system and the stored energy is gradually depleted, the HTF temperature or flow rate (or both) will typically decline. The heat transfer from the TES media to the HTF passing through the TES system depends on the flow rate of the HTF. A slower flow will allow more thermal energy to be transferred to the HTF, heating the HTF to a higher temperature. A faster HTF flow rate will result in a lower HTF temperature. The HTF flow rate and the temperature cannot be independently specified. Solutions to this dilemma are exergetically inefficient, resulting in a reduction in the amount of useful energy that can be extracted from the TES system.

U.S. Patent Application Publication No. 2013/0105106, to Goswami et al., which is hereby incorporated by reference in its entirety, discloses a thermal energy storage system that includes cascades with phase change material for the TES media. However, phase change materials may not have heat transfer rates that are desirable for commercial TES systems.

U.S. Patent Application Publication No. 2013/0056170, to Klemencic, which is hereby incorporated by reference in its entirety, discloses a system that uses cascading multistage thermal energy storage. Other ideas for thermal energy storage address the advantages of cascading with multi-node access. A clear challenge of all of these technologies is the inflexibility to achieve desired/optimal system performance during operation, which is enabled by the current invention. For example, modular thermal energy storage systems that focus upon phase change material storage are disclosed in U.S. Pat. No. 5,165,466, to Arbabian, and in U.S. Pat. No. 4,524,756, to Laverman, each of which is hereby incorporated by reference in its entirety, which build on the existing body of work on cascaded systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A thermal energy storage (TES) system includes a plurality of TES modules, each module having a plurality of thermally conductive sealed tubes disposed in a shell having an inflow port and an outflow port. The sealed tubes contain a TES media, for example an elemental fluid, and the tubes are configured to permit a flow of heat transfer fluid (HTF) to and around the plurality of tubes. A flow control system includes (i) a processing system; (ii) a flow distributor having a plenum (e.g., an inlet chamber for the HTF) with at least one inlet port configured to receive a heat transfer fluid; and (iii) a plurality of control valves. The plurality of control valves fluidly connects the first flow port of a corresponding one of the plurality of thermal energy storage modules to the plenum. Each of the plurality of control valves are controlled by the processing system and configured to produce a time-varying flow of the heat transfer fluid to the plurality of thermal energy storage modules.

In an embodiment the system further includes a plurality of temperature sensors, each temperature sensor disposed in a corresponding one of the plurality of thermal energy storage modules and in signal communication with the processing system, wherein the processor system is configured to use data from the plurality of temperature sensors to control the control valves to produce the time-varying flows.

In an embodiment at least one temperature sensor is additionally provided in the plenum and is in signal communication with the processing system.

In an embodiment a discharge chamber is provided, and is fluidly connected to receive the heat transfer fluid from the second flow ports of the plurality of thermal energy storage modules shells.

In an embodiment the discharge chamber further includes a second flow distributor similar to the first flow distributor, such that the thermal energy storage system is operable with a reversible flow direction.

In an embodiment the plenum includes a first inlet port and a second inlet port into a first compartment and a second compartment, respectively, the first and second inlet ports configured to receive portions of the heat transfer fluid. The first compartment is associated with a first subset of the plurality of control valves and the second compartment is associated with a second subset of the plurality of control valves. For example, the first subset of the plurality of control valves may be fluidly connected with thermal energy storage modules located on a periphery of the closely packed array, and the second subset of the plurality of control valves may be fluidly connected with thermal energy storage modules located centrally in the closely packed array. In an embodiment a flow splitter is provided to split the heat transfer fluid into the first portion and the second portion upstream of heating the heat transfer fluid, and the second portion is heated to a higher temperature than the first portion.

In an embodiment the thermal energy storage media comprises an elemental fluid, for example sulfur. In other embodiments thermal salts or other thermal media may be used.

In an embodiment a thermal blanket is disposed around the closely packed array of thermal energy storage modules.

In an embodiment the shells of the plurality of thermal energy storage modules are rectangular in cross-section, and abut adjacent shells.

In an embodiment the processing system is operable to produce a combined outflow of heat transfer fluid from the thermal energy storage system during an extended period of time in a discharge cycle that has a predetermined time-varying temperature and a predetermined time-varying flow rate, or a predetermined fixed temperature and a predetermined fixed flow rate.

A thermal energy storage system includes a plurality of thermal energy storage modules enclosed in a thermally insulating housing. Each thermal energy storage module includes a plurality of thermally conductive sealed tubes disposed in a shell having a first flow port and a second flow port, the plurality of thermally conductive sealed tubes containing a thermal energy storage media. A flow control system including (i) a processing system, (ii) a plurality of temperature sensors configured to provide temperature data to the processing system, at least one of the plurality of temperature sensors disposed in a corresponding one of each of the thermal energy storage modules, and (iii) a flow distributor having a plenum with at least one inlet port configured to receive a heat transfer fluid. The flow distributor includes a plurality of control valves, each of the control valves fluidly connecting the first flow port of a corresponding one of the plurality of thermal energy storage modules to the plenum. The processing system is configured to use the temperature data to control the plurality of control valves to produce time-varying flows of the received heat transfer fluid to the plurality of thermal energy storage modules.

In an embodiment a discharge chamber is fluidly connected to receive heat transfer fluid from the second flow ports of the plurality of thermal energy storage modules shells. For example, the discharge chamber may include a second flow distributor similar to the first flow distributor, such that the thermal energy storage system is operable with a reversible flow direction.

In an embodiment a first inlet port and a second inlet port to the plenum are provided. The plenum includes a first compartment configured to receive a first portion of the heat transfer fluid through the first inlet port and a second compartment configured to receive a second portion of the heat transfer fluid through the second inlet port. The first compartment is associated with a first subset of the plurality of control valves and the second compartment is associated with a second subset of the plurality of control valves.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
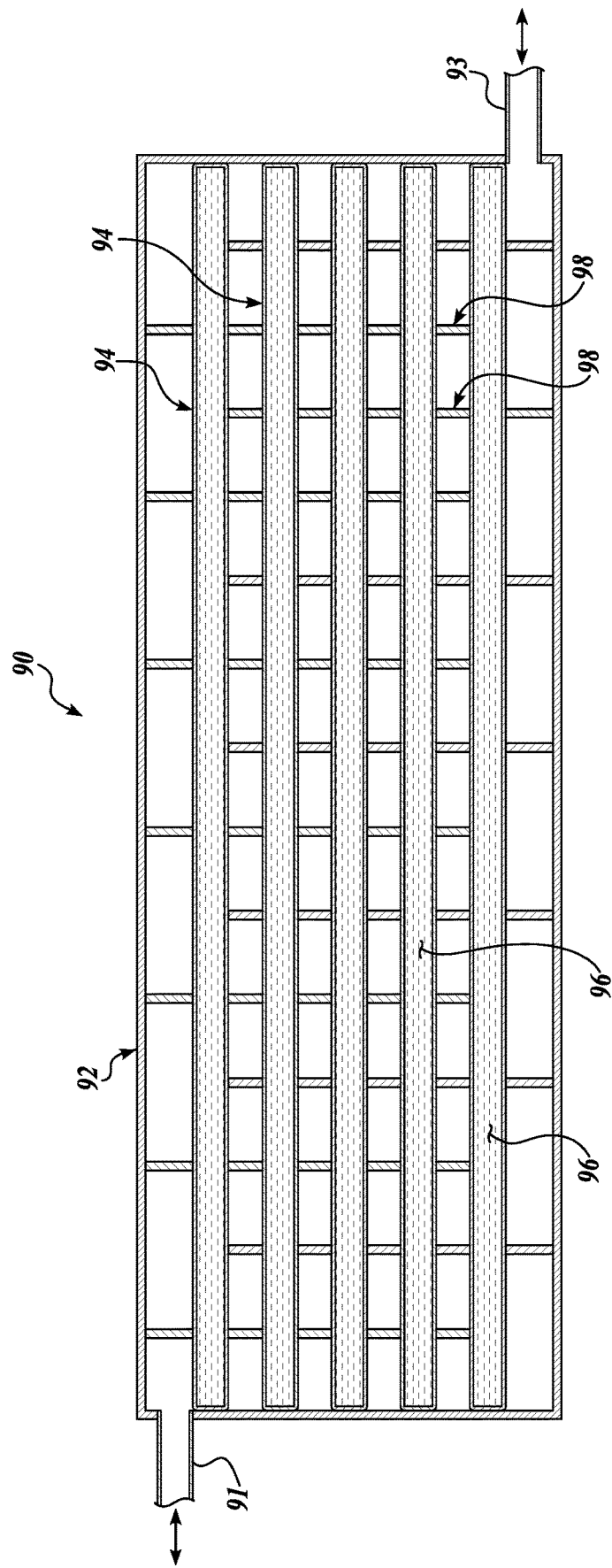
FIG. 1 illustrates a prior art thermal energy storage (TES) module having a plurality of sealed tubes disposed in a shell, each of the sealed tube containing a TES media, wherein a heat transfer fluid (HTF) flows through the shell for thermal energy transfer between the TES media and the HTF.

A modular and flexible thermal energy storage (TES) system is disclosed having a plurality of closely packed TES modules. An exemplary TES module 90 is illustrated in cross section in FIG. 1. The TES module 90 includes a tank or shell 92 enclosing a plurality of thermally conductive sealed tubes 94. The sealed tubes 94 contain a TES media 96. The TES media 96 may be any suitable material for energy storage, including materials selected to absorb and release thermal energy stored as sensible heat, latent heat, and/or by chemical means. A plurality of baffles 98 are configured to define a serpentine flow path for a heat transfer fluid (HTF) flowing through the shell 92 from a first port 91 through the shell 92, and to a second port 93. The HTF preferably has a desirable combination of properties, including suitable phase transition temperatures for the application (is applicable), high thermal conductivity, low viscosity, high heat capacity, chemical stability and compatibility with other system components, low cost, high availability, and favorable environmental properties (e.g., low toxicity, and low volatility).

Exemplary HTFs include gases such as air, steam, helium, and carbon dioxide, and fluids such as water, synthetic oils, molten salts, liquid metals such as sodium and sodium alloys and lead bismuth eutectic compositions. Nanofluids (fluids containing nanoparticles) provide advantages over conventional HTFs. See, for example, U.S. Pat. No. 7,871,533, to Haiping et al, which is hereby incorporated by reference.

The shell 92 includes two or more ports 91, 93 to provide inflow and outflow access for the HTF. The sealed tubes 94 are arranged in the shell 92 in a spaced array, providing a flow path for the HTF along and between the sealed tubes 94. In exemplary embodiments the shell 92 may be polygonal in cross-section, for example rectangular, hexagonal, octagonal, or the like. In other embodiments the shell 92 may be circular or oval.

The sealed tubes 94 may be arranged in a square or hexagonal array, for example. In a current embodiment seven sealed tubes 94 are arranged in a spaced hexagonal array in the shell 92. In a current embodiment the shell 92 is square or rectangular in cross-section.

During a "charge cycle" relatively high-temperature HTF enters the shell 92 and heats the TES media 96 (and the tubes 94). In a "discharge cycle" relatively low-temperature HTF enters the shell 9,2 and the HTF is heated by the TES media 96. In either case, the HTF flows through the shell 92 between and around the sealed tubes 94, in contact with the outer surface of the thermally conductive sealed tubes 94. Optionally, the sealed tubes 94 may be provided with features to facilitate heat transfer between the HTF and the TES media 96 enclosed in the sealed tubes 94, as are known in the art. For example inner and/or outer fins, or other surface-increasing features on the tube inner and/or outer wall surfaces, may facilitate the desired heat transfer. The HTF flow rate during the charge cycle may not be the same as the HTF flow rate for the discharge cycle, and in some applications these flows may be unsteady (time-dependent) and/or dependent on factors such as the availability and temperature of the external thermal energy source(s), and the needs of the thermal energy user.

During the discharge cycle the HTF flowing through the shell 92 is heated, reducing the thermal energy stored in a TES module 90. Over the discharge cycle the temperature of the TES media 96 will decrease. If the HTF flow is maintained at a constant rate, the exit temperature of the HTF will decrease over the course of the discharge cycle due to the decreasing thermal energy in the TES media 96. This may result in an HTF exit temperature that is lower than required for the energy user (e.g., an associated power generator block or the like, not shown). Alternatively, the flow rate of the HTF may be gradually decreased to maintain a constant HTF exit temperature. However, the flow rate of the HTF may then not meet the requirements of the energy user. A conventional single-TES module 90 cannot be optimized to maintain both a constant HTF flow rate and a HTF constant exit temperature.

Figure 2:
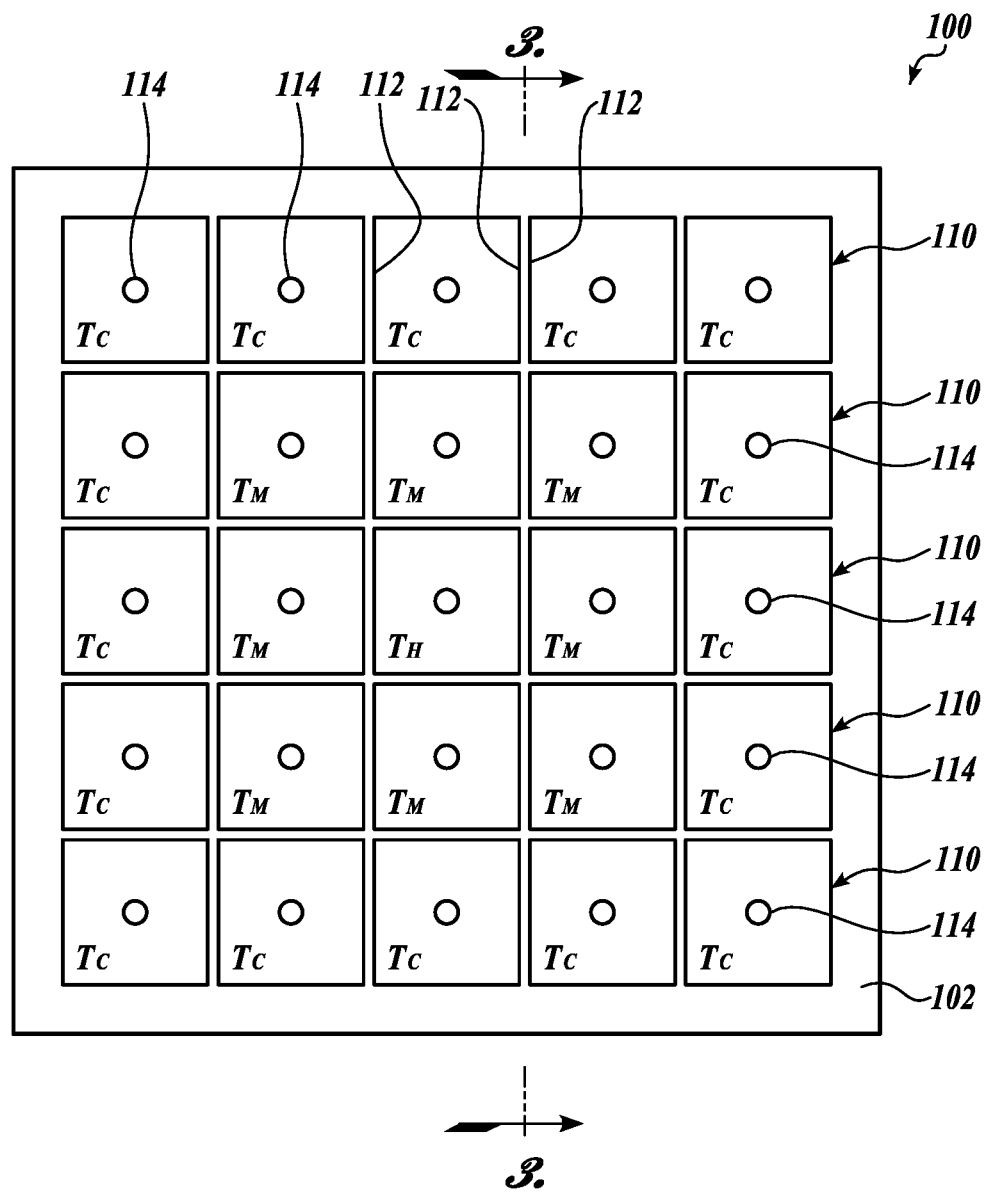
FIG. 2 illustrates in axial cross-section a TES system in accordance with the present invention having a plurality of TES modules disposed in a closely packed array.

In the TES systems 100 illustrated schematically in FIG. 2, a plurality of TES modules 110 are arranged in a modular array. The TES modules 110 may be similar to those shown in FIG. 1. The close arrangement of the modules 110 provides certain advantages. In the exemplary embodiment of FIG. 2, for example, twenty five TES modules 110 are arranged in a square 5×5 array. More or fewer modules 110 are contemplated. An insulating blanket or sheath 102 surrounds the array of TES modules 110. In this embodiment the modules 110 have shells 112 that are rectangular in cross-section and abut or are nearly adjacent to neighboring shells 112. Each of the shells 112 enclose a plurality of sealed tubes 96 (FIG. 1) containing a TES media 96.

Inflow/outflow ports 114 (one shown for each module 110) are provided to accommodate HTF flow through each shell 112. It will be appreciated that TES modules 110 nearer to the center of the system 100 will typically operate at a higher temperatures $T_H$ during use than modules 110 nearer the perimeter producing a transverse thermocline across the system 100. Peripheral TES modules 110 will operate at cooler temperatures $T_C$, and intermediately located TES modules 110 will have more moderate temperatures $T_M$.

The modular TES system 100 allows for a more efficient transfer of thermal energy to and from the system 100, and takes advantage of the compartmentalized structure to allow the system 100 to deliver both a desired outlet temperature and flow rate at the outlet port during discharge cycles.

Figure 3:
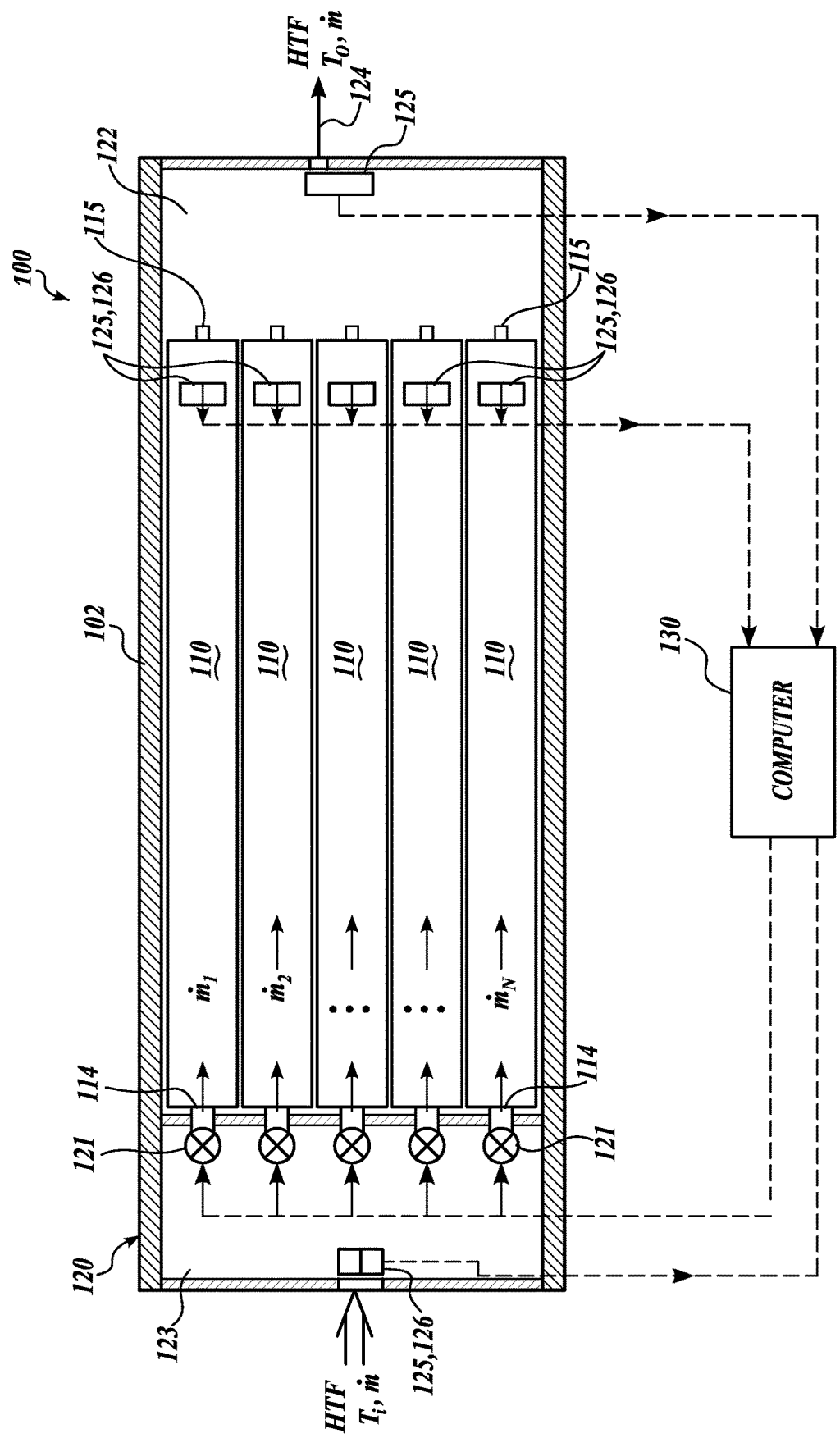
FIG. 3 illustrates schematically a longitudinal cross-section of the TES system shown in FIG. 2.

A longitudinal sectional view of the TES system 100 of FIG. 2 is illustrated in FIG. 3. The TES system 100 includes a controllable flow distributor 120 on at least one end that is configured to receive the HTF at an inlet temperature $T_i$, and a variable flow rate $\dot{m}$. The HTF flow distributor 120 is configured to controllably distribute the incoming HTF to the individual modules 110, such that the flow rate $\dot{m}_1$-$\dot{m}_N$ to the individual modules 110 can be independently controlled, wherein N is the number of modules 110 in the system 100. For example, in some embodiments the HTF flow rate $\dot{m}$, into the flow distributor 120 is constant over the duration of a charge cycle or a discharge cycle. In other embodiments the flow rate may vary over time. The HTF distributor 120 is controlled by a processor system 130, and distributes the received flow to the individual modules 110 in a time-varying manner.

In some applications more than one HTF source may be provided to the HTF flow distributor 120 either simultaneously, sequentially, or overlapping in time. For example, in some applications a plurality of thermal energy sources are available. The flow distributor 120 receives the HTF from the multiple sources, and distributes the HTF to the individual TES modules 110. The outflows from the plurality of TES modules 110 are combined to produce an outlet flow 124. In the system 100, the HTF outlet port 115 from the TES modules 110 are directed into a discharge chamber 122 wherein the individual flows are combined to provide the desired HTF outlet flow 124 at an outlet temperature $T_o$.

In some embodiments the flow distributor 120 comprises an inflow plenum 123, (i.e., an inlet chamber for the HTF) with a plurality of control valves 121. Each of the control valves 121 controls the HTF flow into one of the TES modules 110 through a corresponding port 114. The control valves 121 are operably controlled by the processor system 130. The processor system 130 is in signal communication with sensors, for example distributed temperature sensors 125 and flow sensors 126 in the TES system 100, to monitor the state of the TES modules 110. Other sensors may be provided, for example to monitor pressure or the like. In the system shown in FIG. 3 a temperature sensor 125 and or flow sensor 126 in the inflow plenum 123 monitors the HTF flow rate and temperature entering the inflow plenum 123. Temperature and flow sensors 125, 126 monitor the HTF temperature in the TES modules 110 near the discharge chamber 122. A temperature sensor 125 may also be provided near the HTF outlet flow 124. The sensors 125, 126 are in signal communication with the processor system 130 (indicated by dashed lines), which is configured to provide control signals to the control valves 121, distributing the flow to the TES modules 110 to achieve a desired outlet temperature $T_o$.

It is contemplated that additional sensors may be included, and used by the processing system 130 to control the flow to the TES modules 110. For example, in some embodiments it will be beneficial to monitor pressure in the plenum 123, temperatures at intermediate locations within the TES modules 110, and/or to monitor TES media 96 temperatures directly, to more accurately determine the thermal energy available in the TES modules 110.

For example, consider a discharge cycle in an application in which it is desirable to provide an HTF flow having a specified temperature and flow rate, for example to accommodate a power block user (not shown). During the discharge, cycle relatively cold HTF enters the flow distributor 120 plenum 123, and is controllably distributed to the plurality of TES modules 110 by the processing system 130, using monitored data from the sensors 125, 126 to achieve a specified exit temperature $T_O$. When the discharge cycle is started the TES modules 110 are typically in a relatively high thermal energy state. To achieve the specified outlet temperature at the specified temperature and flow rate most of the HTF may be directed through relatively cool peripheral TES modules 110. As the thermal energy in the TES modules 110 declines, the processing system 130 receives the sensor data and controls the flow distributor valves 121 to direct an increasing portion of the HTF flow through more interior TES modules 110 to maintain the specified outlet temperature and flow rate. Even as the thermal energy in the TES system 100 is depleted, the system 100 may be operated for an extended period time producing the specified outlet temperature and flow rate.

In some applications a non-steady HTF temperature and flow rate may be preferred. The processing system 130 may control the valves 121 to produce a specified unsteady flow rate and/or outflow temperature even as the stored thermal energy decreases.

It will be apparent to persons of skill in the art that the TES system 100 may be controlled to produce any desired outlet temperature profile. By actively controlling the flow rates to the TES modules 110 the temperature and mass flow rate of the combined outflow can be independently controlled.

Although the embodiment in FIG. 3 illustrates one method for controlling the plurality of flows of the HTF through the plurality of TES modules 110 using a plenum 123 and separate control valves 121, other flow distribution systems are contemplated. For example, in some systems separate pumping systems may connect the HTF with a corresponding TES module 110, and the pump may be controlled by the processing system to provide controllable flows to the TES modules 110.

Although in the embodiment shown in FIG. 3, one side of the TES modules 110 are connected to a flow distributor 120 and the other side is connected to a passive discharge chamber, in other embodiment a flow controller 120 may be provided on both sides of the TES system 100, for example, such that the HTF flow through the TES modules 110 may also be actively controlled during the charge cycle. For example, the HTF flow rates during the charge cycle may be controlled to optimize heat transfer to the TES media 96. For example, the exergetic efficiency during the charge cycle may be optimized by minimizing the temperature difference between the relatively hot HTF and the relatively cold TES media 96.

The close-packed system of TES modules 110 is readily expandable with the addition of modules 110. The close-packed arrangement greatly reduces thermal losses to the environment because peripheral modules 110 thermally insulate hotter interior modules 110. Because the TES media is stationary it does not open voids during discharging that must be filled by cool or heated gases (both of which would decrease system efficiency). Enclosing the TES media also reduces corrosion rates as compared with corrosion with a flowing TES media open to the environment. The modularity allows for component replacement without system downtime or reduced downtime, and the standard materials and the uniformity of parts of the system reduce manufacturing time and cost. All of these, cost, thermal efficiency, and operational benefits are allowed by the geometry of the disclosed close-packed modular TES design.

The TES system 100 may be applied to a wide variety of applications spanning a correspondingly wide range of temperature regimes. In lower temperature embodiments, for example TES systems designed to operate in a range of temperatures between 0° C. and 400° C., the TES media may be fluids such as thermal oils or water. If the heat transfer rate is not critical a solid TES media, for example concrete, may be used. In higher temperature applications, for example applications requiring HTF fluids in excess of 1,000° C., suitable TES medias may include elemental materials, for example elemental sulfur. Thermal salts, or other thermal media as are known in the may alternatively be used.

As discussed above, it will be apparent to persons of skill in the art that the more centrally located TES modules 110 will operate at a higher temperature than the more peripheral TES modules. Therefore, TES modules 110 to be located near the periphery of the modular TES system 100 may use a TES media that is optimized for lower temperatures, and TES modules 110 to be located more centrally may use a different TES media, which is optimized for higher temperatures.

Figure 4:
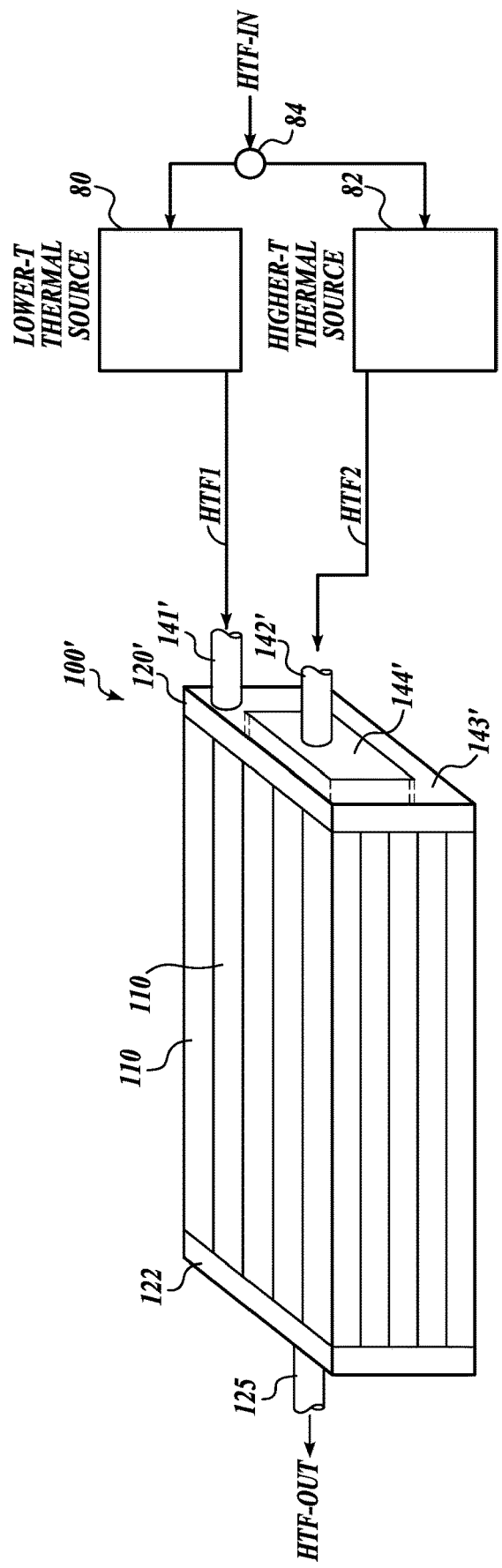
FIG. 4 illustrates another embodiment of a TES system in accordance with the present invention.

FIG. 4 illustrates a modular TES system 100' configured to store and release thermal energy from a plurality of sources (two indicated), for example a lower-temperature source 80 and a higher-temperature source 82. FIG. 4 illustrates a charge cycle, wherein thermal energy from multiple sources 80, 82 is transported to the TES modules 110. In this embodiment the HTF is directed through a flow splitter 84 that may be monitored and controlled by the processing system 130 (FIG. 3). The flow splitter 84 directs a first portion of the HTF (HTF1) through the lower-temperature source 80, and a second portion of the HTF (HTF2) through the higher-temperature source 82. The two flows, HTF1 and HTF2, are directed into a flow distributor 120' similar to the flow distributor 120' discussed above, excepting that the flow distributors have a plurality of segregated compartments. The flow distributor 120' includes a first port 141' into a peripheral compartment 143' that receives the cooler HTF1 flow, and a fluidly separated central compartment 144' that receives the hotter HTF2 flow through a second port 142'. The lower-temperature HTF1 flow is directed to the more peripheral TES modules 110 and the higher-temperature HTF2 flow is directed to the more central TES modules 110. In this configuration the modular TES system 100' will more efficiently store the thermal energy from the multiple sources. Also, because the lower-temperature HTF1 flow does not mix with the higher-temperature HTF2 flow prior to entering the TES system 100', the higher peak temperature from the higher-temperature source 82 is better preserved.

It is contemplated that modular TES systems 100 may have a large number of TES modules 110 and a large number of thermal energy sources, and that the HTF flow may be split into more than two regions to more efficiently accommodate the available sources.

Figure 5:
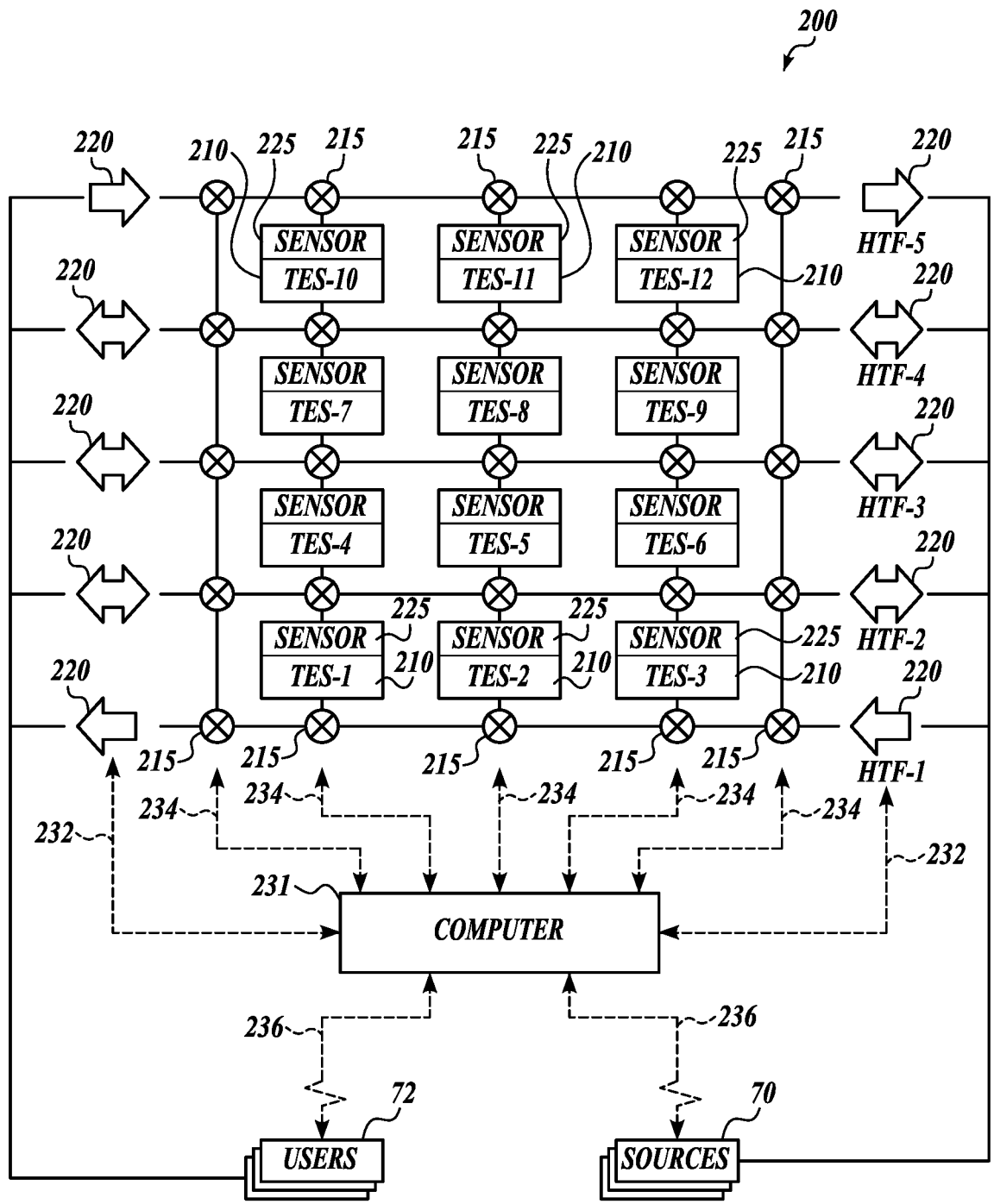
FIG. 5 illustrates a multi-node, multi-access energy storage system that may include one or more TES systems in accordance with the present invention.

Refer now to FIG. 5, which illustrates a TES system 200 that incorporates a plurality of interconnected spaced-apart TES subsystems 210 (e.g., using a common HTF reservoir). One or more of the TES subsystems 210 may be TES modules 90 (FIG. 1), and one or more may be an array of TES modules 110 as illustrated in FIG. 2. An interconnected TES system 200 is illustrated schematically in FIG. 5, having a network 201 of interconnected TES subsystems 210 and a control system 231 configured to controllably circulate an HTF between a plurality of users 72 and a plurality of thermal energy sources/generators 70.

The TES system 200, includes a plurality of TES subsystems 210 arranged in a flexible, multi-node, multi-access (MNMA) configuration (also referred to as multi-point, multi-access, or MPMA) wherein HTF flows to and from the spaced-apart TES subsystems 210 are controllable over a piping grid 205. The TES subsystems 210 are interconnected in parallel and in series relative to a controllable HTF flow through the piping grid 205. Each of the TES subsystems 210, therefore, represents a location or node at which thermal energy may be exchanged between the HTF and TES media in the TES subsystem 210. It is contemplated that the HTF may transport thermal energy from a variety of sources to the TES subsystems 210. For example, the available sources may include process flow streams, resistive heating elements (for example, to store excess grid energy, photovoltaic or wind energy, etc.), combustion energy, geothermal energy, or the like.

The arrangement and interconnection of the TES subsystems 210 on the HTF piping grid 205 provides multi-access control over where in the TES system 200 the HTF is introduced and removed. The HTF flow may enter the piping grid 205, for example from the energy users 72 or sources 70. This multi-access configuration allows operation of the system 200 at optimal conditions for a variety of sources and a variety of users of the energy. The TES subsystems 210 may contain very different TES medias selected to operate in very different temperature ranges. Providing multi-access allows operation at desired/optimal conditions for thermal energy storage from an exergetic, energetic, system design cost, and operational cost standpoints.

The multi-node configuration (represented by multi-directional valves 215) uses a cross-strapping approach to enable the HTF flow rate to be controlled between and through each TES subsystem 210 to allow the HTF flow to be delivered to each subsystem 210 and to each access node. In this way, the TES system 200 and its interaction with the sources and users it supports may be highly controlled and optimized for performance and costs.

The TES system 200 includes a control system 230, for example including a processor 231 that is in signal communication with sensors 225 in the TES system 200, and the energy sources 70 and users 72. In the exemplary TES system 200 in FIG. 5, twelve spaced-apart TES subsystems 210 are interconnected in a two-dimensional fluid grid. Each of the subsystems 210 includes a sensor or sensor array 225 that is in signal communication with the control system 230, and the interconnecting valves 215 are controlled by the control system (arrows 234). The sensor or sensor arrays 225 may include one or more temperature sensors and/or flow sensors. For example, temperature sensors may be provided to monitor local HTF temperatures, TES media sensors, or the like.

The control system 230 is also configured to receive information regarding the availability, status, and needs of the plurality of energy sources 70 and users 72 (arrows 236), and sensor data regarding HTF flow rates 220 into our of the system 200 (arrows 232). Using the received data, the processor 230 controls the valves 215 to generate flow rates to optimize the thermal performance and responsiveness of the system, according to predetermined goals. It will be appreciated that the TES subsystems 210 may be of different types, and optimized for particular temperature ranges.

Figure 6:
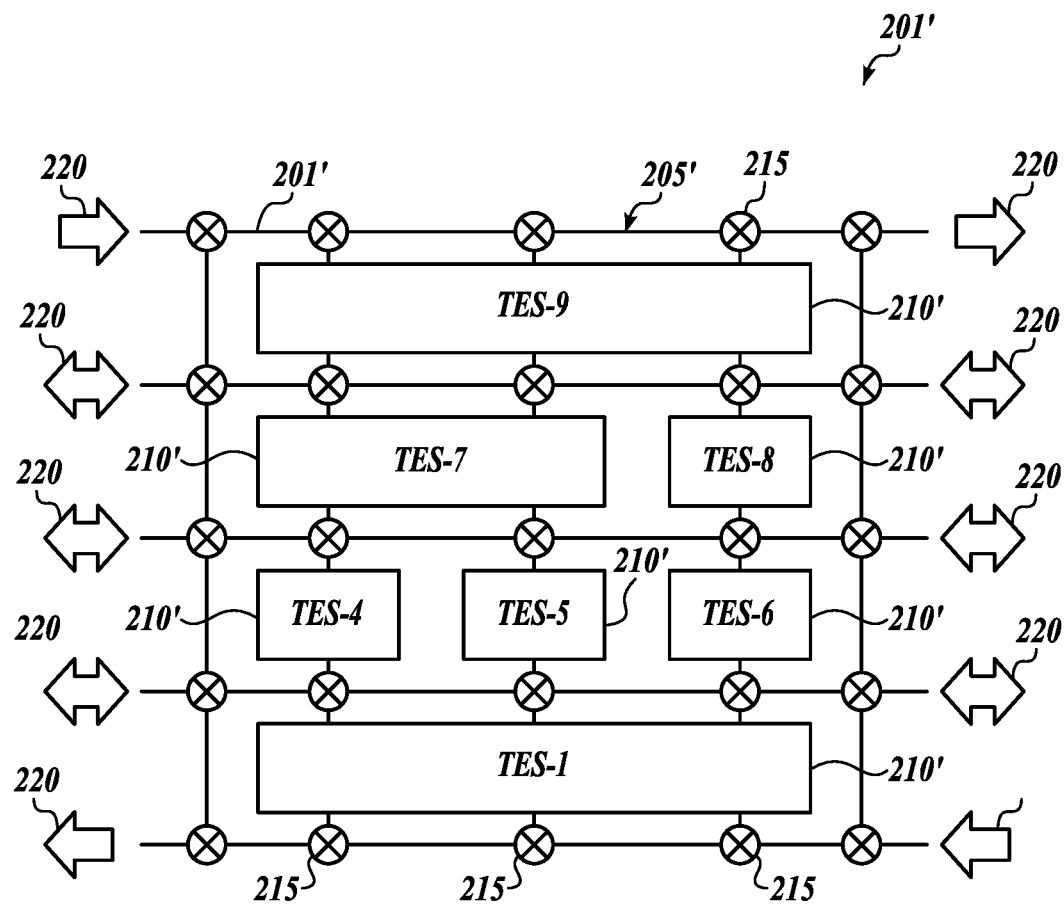
FIG. 6 illustrates another multi-node, multi-access energy storage system, networking a diverse collection of TES subsystems.

FIG. 6 illustrates another embodiment of an MNMA TES system 200' comprising seven TES subsystems 210', wherein the control system 230 is omitted for clarity. This system 200' may be similar to the system 200 of FIG. 5, except as described below. In this embodiment the TES subsystem 210' sizes and the interconnections (through valves 215) are not uniform. The particular configurations may be designed or selected to accommodate available thermal energy sources, and to achieve desired system cost, configuration, and performance objectives. The individual modules may be designed internally or sized/configured within the system to achieve the desired performance at the expected operating conditions (i.e., pressure, temperature, flow rate, etc.) for a particular region in the HTF cycle.

The plurality of TES subsystems 210, 210', provide controllable flexible interconnections with the HTF, allowing optimization of the thermal energy storage system by flexible control of the HTF flow throughout the system 200. These advantages may be realized through the use of the MNMA configurations and controllability of the thermal energy storage system and its interface with the sources and users of such energy within an energy storage and generation system.

The MNMA TES system 200 allows flexible and responsive control to optimize performance with an interconnected array of disparate sources and loads, either collocated or separated, and the ability to react to changes in the thermodynamic conditions of the individual subsystems. The flexibility of the system provides the ability to dynamically adapt to changes. For example, if excess thermal energy is available for storage, the HTF may be directed to the TES modules that will receive the heat with minimal exergetic losses (e.g., with a small temperature difference). Alternatively, if there is a need for a more rapid heat transfer, the HTF may be directed to a TES module operating at a much lower temperature. Simply put, industry can get what it expects/wants from the system, such as heat rate, thermal storage rate, temperature, flow rate, etc.

The disclosed system also allows individual modules to be designed specifically for an expected range of operating conditions (e.g., temperature, pressure, flow rates, and heat transfer rate) while also allowing controllability of the sources, users, and HTF such that their operation can be kept within the desired ranges based on plant operational metrics, including cost, safety, dispatchability, availability, responsiveness, and so forth.

An important objective is to reduce the cost and increase the profitability of an energy system by employing an MNMA TES system 200 that allows a known fraction of the overall storage temperature range to manifest only at certain locations in the system. Such an approach allows the optimization of individual modules to reduce capital, operating, and maintenance costs related to the TES media and the containment material. TES subsystems 210 that will be controlled to remain below a particular temperature may be designed accordingly, even though other TES subsystems 210 in the MNMA TES system 200 may see higher temperatures. Similar cost reductions can be realized at all points in the system, including for example piping, valves, sensors, control systems, etc.

Similarly, the most attractive TES medias and containment material options to be used for each module based on the expected operating conditions (temperature, flow rate, heat transfer rate, etc.) for the particular TES subsystem 210. For example, lower temperature materials for the colder subsystems, higher temperature materials for hotter subsystems. Additionally, unique configurations can be used for each subsystem 210.

The MNMA TES system 200 allows for the integration of a wide variety of energy sources into a single system, and easy expansion or re-configuration. If a new TES subsystem 210 becomes available, it can be readily integrated in a modular fashion with a wide variety sources and users (e.g., CSP to electricity) for many applications (e.g., CSP, wind, solar photovoltaic (PV), geothermal, process heat, combined heat and power (CHP), etc.). It also provides the ability to cost-effectively achieve an extremely broad temperature range, which is not possible with existing TES systems.

The MNMA system 200 offers attractive advantages for TES system operation, due to the inherent flexibility. The MNMA system may be designed to a particular range of anticipated operating conditions, but may also accommodate in-situ demands for performance, efficiency, responsiveness, demand and source response, demand and source availability, related costs and pricing optimization, and so forth.

The disclosed TES system is believed to provide a completely new approach to TES that is heat source and heat load agnostic, and may be configured to operate over a wide temperature range. A major application of this technology is concentrated solar power (CSP) plants, both as they are built now and the anticipated future of the technology. In particular, the future of CSP is expected to operate and require storage at temperatures in excess of 600° C. There are many CSP projects currently in operation and under construction. Another major application of this technology is providing energy storage for combined heat and power, or cogeneration, applications (CHP). For industrial applications, TES separates the electricity generation from the heat need by the industrial facility. This allows for CHP plants to levelize the grid, and may provide additional revenue for the industrial facility.

Although these are the two significant applications for the disclosed system, other applications being considered are waste heat, waste-to-energy, geothermal, wind energy, and grid storage systems.

It will be appreciated by persons of skill in the art that the disclosed MNMA system differs from conventional cascade system, wherein two or more TES systems may be provided in series. The Modular TES system of FIG. 6 interconnects TES systems in a two-dimensional (or multi-dimensional) array.

An array of dissimilar TES system allows for optimization of each tank for a particular temperature range. For example, different interconnected TES modules may use phase change materials that undergo phase change at different temperatures.

The array of TES systems also provides advantages in reliability and redundancy. One potential application for TES systems such as is illustrated in FIG. 6, is the integration of the TES system with existing centralized solar power and cogeneration facilities. Although a TES system may be only a small fraction of the CSP or cogeneration system, mixing of the TES media, for example high temperature sulfur, with the HTF can cause significant damage to the entire system. Even if a TES failure is timely recognized, the entire TES system would have to be shut down for repair. However, the arrayed system shown in FIG. 6 allows any single or subset of TES systems to be bypassed completely with minimal impact to other components in the system. Similarly, individual TES systems may be shut down for regularly scheduled repair or maintenance while the rest of the system remains up and running.

While illustrative embodiments have been illustrated and described, it will be appreciated that various changes can be made therein without departing from the spirit and scope of the invention.

The invention claimed is:

1. A thermal energy storage system comprising:
a plurality of thermal energy storage modules arranged in a closely packed array, wherein each module comprises a plurality of thermally conductive sealed tubes disposed in a shell having a first flow port and a second flow port, the plurality of thermally conductive sealed tubes containing a thermal energy storage media, wherein the plurality of sealed tubes are spaced apart;
a flow control system comprising a processing system operably connected to a flow distributor wherein the flow distributor is configured to receive a heat transfer fluid and to controllably distribute the received heat transfer fluid to the plurality of thermal energy storage modules,
wherein the processing system controls the flow distributor to produce time-varying flows of the received heat transfer fluid to the plurality of thermal energy storage modules;
wherein the flow distributor comprises a plenum with at least one inlet port configured to receive the heat transfer fluid and a plurality of control valves fluidly connecting the first flow port of a corresponding one of the plurality of thermal energy storage modules to the plenum, and wherein each of the plurality of control valves are controlled by the processing system to produce the time-varying flows; and
wherein the at least one inlet port comprises a first inlet port and a second inlet port, and further wherein the plenum comprises a first compartment configured to receive a first portion of the heat transfer fluid through the first inlet port and a second compartment configured to receive a second portion of the heat transfer fluid through the second inlet port, wherein the first compartment is associated with a first subset of the plurality of control valves and the second compartment is associated with a second subset of the plurality of control valves.

2. The thermal energy storage system of claim 1, further comprising a plurality of temperature sensors, each temperature sensor disposed in a corresponding one of the plurality of thermal energy storage modules and in signal communication with the processing system, wherein the processing system is configured to use data from the plurality of temperature sensors to control the control valves to produce the time-varying flows.

3. The thermal energy storage system of claim 2, further comprising at least one temperature sensor in the plenum that is in signal communication with the processing system.

4. The thermal energy storage system of claim 2, further comprising a discharge chamber fluidly connected to receive heat transfer fluid from the second flow ports of the plurality of thermal energy storage modules shells, the discharge chamber having a discharge outlet flow port.

5. The thermal energy storage system of claim 4, wherein the discharge chamber comprises a second flow distributor similar to the first flow distributor, such that the thermal energy storage system is operable with a reversible flow direction.

6. The thermal energy storage system of claim 1, wherein the first subset of the plurality of control valves are fluidly connected with thermal energy storage modules located on a periphery of the closely packed array, and the second subset of the plurality of control valves are fluidly connected with thermal energy storage modules located centrally in the closely packed array.

7. The thermal energy storage system of claim 6, further comprising a flow splitter configured to split the heat transfer fluid into the first portion and the second portion upstream of heating the heat transfer fluid, wherein the second portion is heated to a higher temperature than the first portion.

8. The thermal energy storage system of claim 1, wherein the thermal energy storage media comprises an elemental fluid.

9. The thermal energy storage system of claim 8, wherein the elemental fluid comprises sulfur.

10. The thermal energy storage system of claim 1, further comprising a thermal blanket disposed around the closely packed array of thermal energy storage modules.

11. The thermal energy storage system of claim 1, wherein the shells of the plurality of thermal energy storage modules are rectangular in cross-section, such that planar walls of the shells abut.

12. The thermal energy storage system of claim 1, wherein the processing system is operable to produce a combined outflow of heat transfer fluid from the thermal energy storage system during an extended period of time in a discharge cycle that has a predetermined time-varying temperature and a predetermined time-varying flow rate.

13. The thermal energy storage system of claim 1, wherein the processing system is operable to produce a combined outflow of heat transfer fluid from the thermal energy storage system during an extended period of time in a discharge cycle that has a predetermined fixed temperature and a predetermined fixed flow rate.

14. A multi-node, multi-access energy storage system comprising a plurality of the thermal energy storage system of claim 1 that are fluidly interconnected to control a flow of a plurality of heat transfer fluid streams through the plurality of thermal energy storage systems.

15. The multi-node, multi-access energy storage system of claim 14, wherein each of the plurality of heat transfer fluids are operably connected to each of the plurality of thermal energy storage systems.

16. A thermal energy storage system comprising:
a plurality of thermal energy storage modules enclosed in a thermally insulating housing, wherein each thermal energy storage module comprises a plurality of thermally conductive sealed tubes disposed in a shell having a first flow port and a second flow port, the plurality of thermally conductive sealed tubes containing a thermal energy storage media;
a flow control system comprising a processing system, a plurality of temperature sensors configured to provide temperature data to the processing system, at least one of the plurality of temperature sensors disposed in a corresponding one of each of the thermal energy storage modules, and a flow distributor having a plenum with at least one inlet port configured to receive a heat transfer fluid, the flow distributor further comprising a plurality of control valves, each of the control valves fluidly connecting the first flow port of a corresponding one of the plurality of thermal energy storage modules to the plenum;
wherein the processing system is configured to use the temperature data to control the plurality of control valves to produce time-varying flows of the received heat transfer fluid to the plurality of thermal energy storage modules; and
wherein the at least one inlet port comprises a first inlet port and a second inlet port, and further wherein the plenum comprises a first compartment configured to receive a first portion of the heat transfer fluid through the first inlet port and a second compartment configured to receive a second portion of the heat transfer fluid through the second inlet port, wherein the first compartment is associated with a first subset of the plurality of control valves and the second compartment is associated with a second subset of the plurality of control valves.

17. The thermal energy storage system of claim 16, further comprising a discharge chamber fluidly connected to receive heat transfer fluid from the second flow ports of the plurality of thermal energy storage modules shells.

18. The thermal energy storage system of claim 17, wherein the discharge chamber comprises a second flow distributor similar to the first flow distributor, such that the thermal energy storage system is operable with a reversible flow direction.

* * * * *